(12) United States Patent
Cao et al.

(10) Patent No.: US 12,294,947 B2
(45) Date of Patent: May 6, 2025

(54) METHODS AND APPARATUS FOR WIRELESS DEVICE OPERATION

(71) Applicant: QUALCOMM Incorporated, San Diego, CA (US)

(72) Inventors: Yiqing Cao, Beijing (CN); Tingfang Ji, San Diego, CA (US); Wanshi Chen, San Diego, CA (US); Krishna Kiran Mukkavilli, San Diego, CA (US); Juan Montojo, San Diego, CA (US); Peter Pui Lok Ang, San Diego, CA (US); Jing Lei, San Diego, CA (US); Huilin Xu, Temecula, CA (US); Yan Li, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 351 days.

(21) Appl. No.: 17/755,783

(22) PCT Filed: Nov. 25, 2019

(86) PCT No.: PCT/CN2019/120552
§ 371 (c)(1),
(2) Date: May 6, 2022

(87) PCT Pub. No.: WO2021/102622
PCT Pub. Date: Jun. 3, 2021

(65) Prior Publication Data
US 2022/0408360 A1 Dec. 22, 2022

(51) Int. Cl.
*H04W 52/02* (2009.01)
(52) U.S. Cl.
CPC ... *H04W 52/0235* (2013.01); *H04W 52/0212* (2013.01)

(58) Field of Classification Search
None
See application file for complete search history.

(56) References Cited

U.S. PATENT DOCUMENTS 10,067,237 B1 * 9/2018 Liu ..................... G01S 19/42
11,147,459 B2 * 10/2021 Sobol .................... H04W 4/80
(Continued)

FOREIGN PATENT DOCUMENTS

| CN | 104615097 A | 5/2015 |
| CN | 105786154 A | 7/2016 |

(Continued)

OTHER PUBLICATIONS

International Search Report and Written Opinion—PCT/CN2019/120552—ISAEPO—Aug. 27, 2020.
(Continued)

*Primary Examiner* — Faiyazkhan Ghafoerkhan
(74) *Attorney, Agent, or Firm* — Arent Fox, LLP

(57) ABSTRACT

The present disclosure relates to methods and devices for wireless communication at a wireless device of a wireless wearable device. In one aspect, the wireless device may transmit a first report based on one of a location of the wireless wearable device, a time period, or reception of a user-controlled indication to transmit the first report. The wireless device may also receive, based on the transmitted first report, a configuration to switch from a first mode to a second mode. In some aspects, the configuration can include at least one parameter associated with a power savings at the wireless wearable device while in the second mode. Additionally, the wireless device can operate based on the at least one parameter while in the second mode.

40 Claims, 6 Drawing Sheets

(56) References Cited

U.S. PATENT DOCUMENTS

| | | | |
|---|---|---|---|
| 2015/0296371 A1* | 10/2015 | Kong | H04M 1/72463 455/419 |
| 2019/0209022 A1* | 7/2019 | Sobol | H04W 4/80 |
| 2022/0039673 A1* | 2/2022 | Sobol | A61B 5/7275 |
| 2022/0408360 A1* | 12/2022 | Cao | H04M 1/72448 |

FOREIGN PATENT DOCUMENTS

| | | |
|---|---|---|
| CN | 107979652 A | 5/2018 |
| EP | 2463839 A1 | 6/2012 |
| WO | 2007011831 A2 | 1/2007 |
| WO | 2015095597 A1 | 6/2015 |
| WO | 2015157677 A1 | 10/2015 |
| WO | 2018222417 A1 | 12/2018 |

OTHER PUBLICATIONS

Supplementary European Search Report—EP19953776—Search Authority—Munich—Jul. 7, 2023.

* cited by examiner

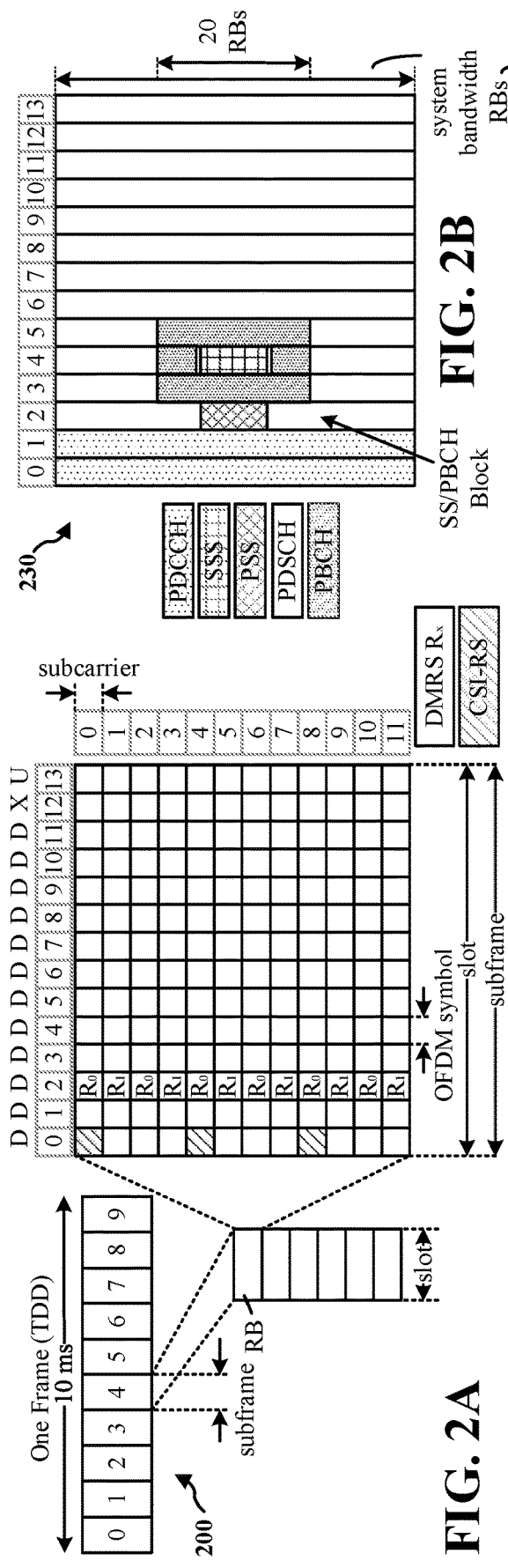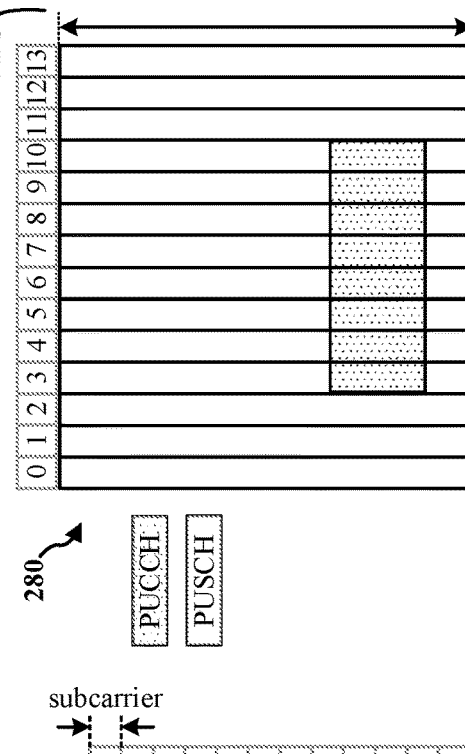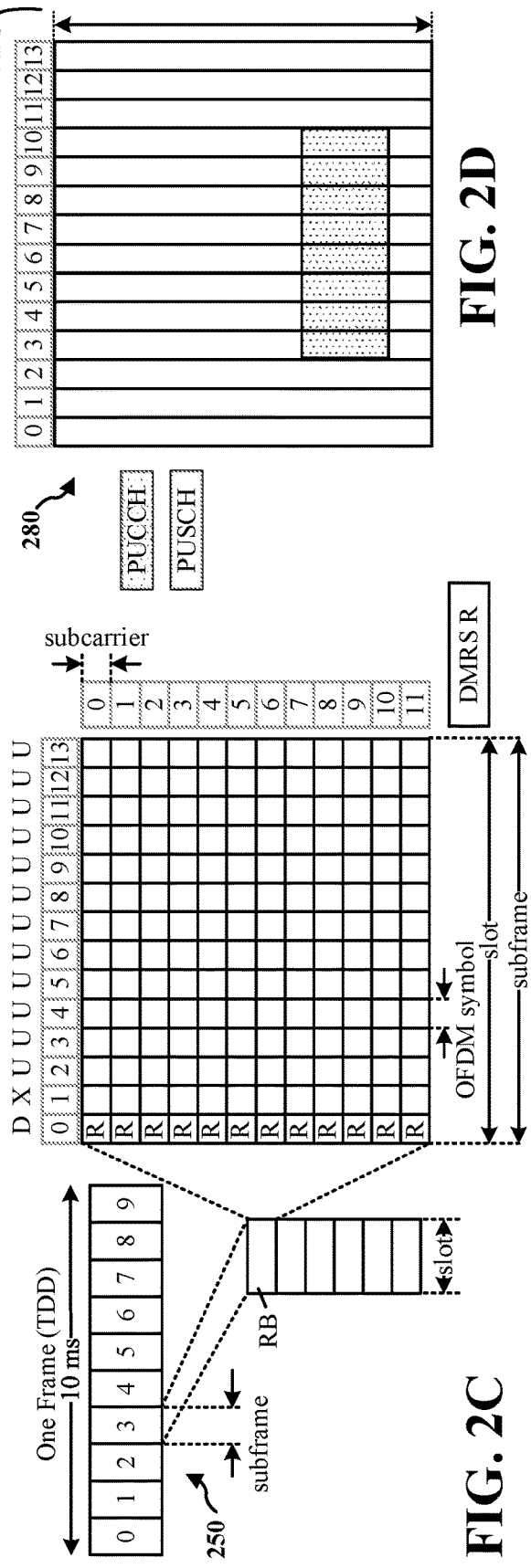
FIG. 2A
FIG. 2B
FIG. 2C
FIG. 2D

METHODS AND APPARATUS FOR WIRELESS DEVICE OPERATION

CROSS REFERENCE TO RELATED APPLICATION(S)

This application is a National Phase entry of PCT Application No. PCT/CN2019/120552, entitled "METHODS AND APPARATUS FOR WIRELESS DEVICE OPERATION" and filed on Nov. 25, 2019, which is expressly incorporated by reference herein in its entirety.

BACKGROUND

Technical Field

The present disclosure relates generally to communication systems, and more particularly, to wireless communication for operating wireless devices.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a wireless device of a wireless wearable device. In some aspects, the wireless device may transmit a first report based on one of a location of the wireless wearable device, a time period, or reception of a user-controlled indication to transmit the first report. The wireless device may also receive, based on the transmitted first report, a configuration to switch from a first mode to a second mode, where the configuration can include at least one parameter associated with a power savings at the wireless wearable device while in the second mode. Additionally, the wireless device may operate based on the at least one parameter while in the second mode. The wireless device may also transmit a second report while in the second mode, where the second report can be transmitted based on the at least one parameter. The wireless device may also determine to transmit the second report based on at least one of a location of the wireless wearable device or a velocity of the wireless wearable device. Further, the wireless device may determine to transmit the first report based on one of a location of the wireless wearable device, a time period, or reception of a user-controlled indication to transmit the first report. The wireless device may also determine based on a trigger to switch from the second mode to the first mode. The wireless device may also exit the second mode and enter into the first mode upon receiving the trigger to switch from the second mode to the first mode.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
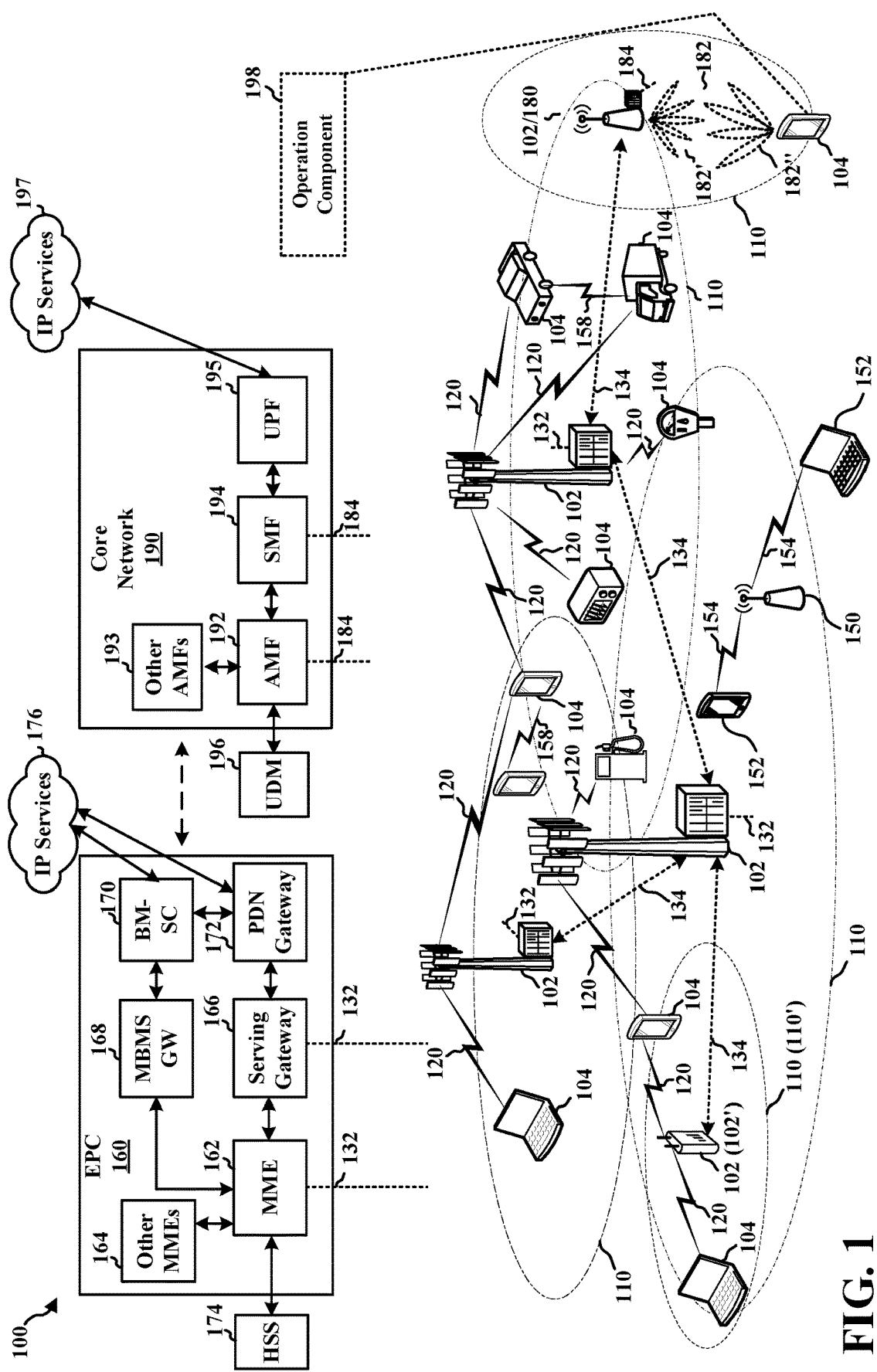
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include an operation component 198 configured to transmit a first report based on one of a location of the wireless wearable device, a time period, or reception of a user-controlled indication to transmit the first report. Operation component 198 may also be configured to receive, based on the transmitted first report, a configuration to switch from a first mode to a second mode, where the configuration can include at least one parameter associated with a power savings at the wireless wearable device while in the second mode. Operation component 198 may also be configured to operate based on the at least one parameter while in the second mode. Operation component 198 may also be configured to transmit a second report while in the second mode, where the second report can be transmitted based on the at least one parameter. Operation component 198 may also be configured to determine to transmit the second report based on at least one of a location of the wireless wearable device or a velocity of the wireless wearable device. Operation component 198 may also be configured to determine to transmit the first report based on one of a location of the wireless wearable device, a time period, or reception of a user-controlled indication to transmit the first report. Operation component 198 may also be configured to determine based on a trigger to switch from the second mode to the first mode. Operation component 198 may also be configured to exit the second mode and enter into the first mode upon receiving the trigger to switch from the second mode to the first mode. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu 0$ to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology s, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
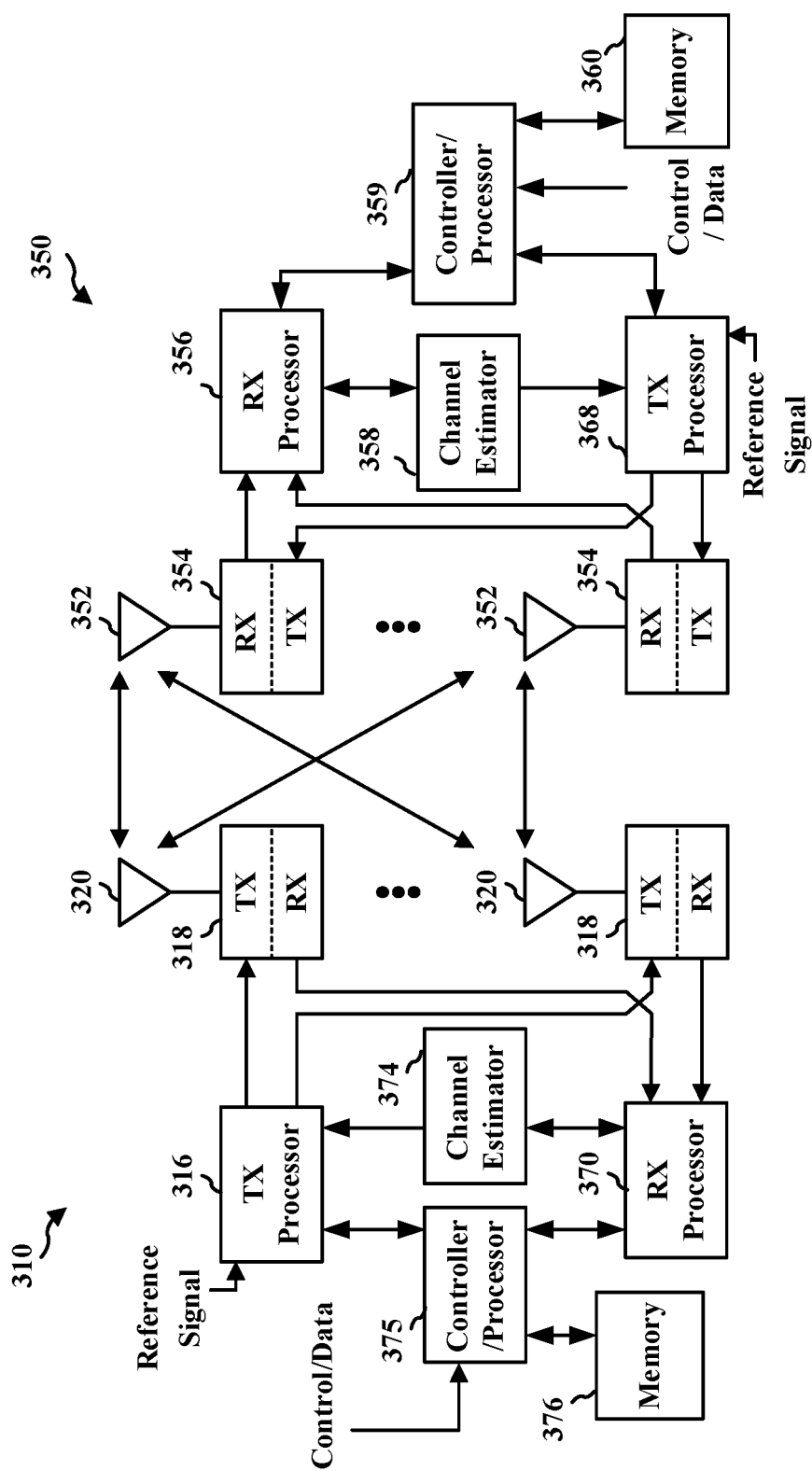
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

Smart devices or smart watches are utilized for a number of different purposes or specific uses, e.g., location tracking or push-button call capability. In some aspects, the location tracking can include the position of the user wearing the smart device or smart watch. Moreover, some high end smart watches can be capable of more advanced features, such as video calls. Smart watches have gained popularity based on their ease of use and convenient functionalities.

In some aspects, certain functions of smart watches or smart devices may include the capability to be paged by certain users, e.g., a second user or parent. As indicated herein, this remote control functionality may limit the application capability of the smart device during specified time periods. By limiting the functionality of the smart device during specific time periods, this can help to keep the first user, e.g., a child, focused during the specified time period. In some instances, there can be multiple functions or applications that have limited capability during the specified time period, e.g., the ability to enable or disable video calls at the smart device. This limited application capability can also apply to different wireless communication categories utilized by the smart watch smart device, e.g., LTE or NR.

As indicated herein, users of smart watches may desire a functionality to start or stop certain applications remotely. For instance, a user may desire the capability to remotely open and/or close some functions or applications on the smart device. For example, the capability to make phone calls or video calls may be enabled or disabled when certain conditions are met. Also, these disabled or enabled functions may be based on a specific time period, e.g., the time period when school is in session. By doing so, certain users, e.g., parents, can remotely control the functionality of other smart devices, e.g., smart devices worn by their children.

In some aspects, smart watches and other smart wearable device may be limited based on power consumption. For instance, saving battery for a remote control mode or school mode may need some wireless communication optimization, e.g., lower layer optimization. As mentioned herein, smart devices can utilize a form of wireless communication, e.g., LTE or NR. Also, a lower layer of communication between devices, e.g., an RRC layer, may not be aware of the amount of power consumed by each device. Based on this, the smart phone or smart watch may need to perform some application layer optimization.

In some aspects, discontinuous applications may be limited in the types of wireless communications for devices, e.g., smart phones or smart watches may not adhere to discontinuous reception (DRX). As such, there may not be power saving optimization for these types of devices utilizing certain types of wireless communications, e.g., LTE or NR. Accordingly, there is a present need for the ability to remotely control different smart devices or smart watches in order to achieve power savings and/or desired application functionality.

Aspects of the present disclosure can include the ability to remotely control different smart devices in order to save power at the devices and/or achieve a user desired application functionality. For instance, aspects of the present disclosure can include a remote control mode, i.e., school mode, in order to optimize power savings for devices utilizing wireless communications. In the remote control mode or school mode, a second user using a second device can control a first device of a first user, e.g., in order to save power or limit the functionality of the first device. As such, a second device may remotely control the lower layer of wireless communication of the first device. By doing so, this may reduce the amount of power utilized by the device, e.g., during a specified time period.

Aspects of the present disclosure can also include a signaling mode or parent-assisted signaling mode where a second user, e.g., a parent, remotely triggers the first user's smart device by entering or exiting the remote control mode. For instance, parent-assisted signaling can include a number of different power related parameters, e.g., DRX and paging parameters, bandwidth parameters, or a maximum transmission power. Additionally, parent-assisted signaling can include a whitelist which can allow certain types of calls during the remote control mode or school mode, e.g., calls to or from parents and/or emergency calls. Further, parent-assisted signaling can include an allowed application list, e.g., session identifiers or certain allowed applications or games. Also, parent-assisted signaling can include positioning parameters or different positioning levels, e.g., a service set identifier (SSID), base station (BS) assisted information, or Global Positioning System (GPS) information.

In some aspects, in remote control mode or school mode, a second user may need to determine the location of the first user. For example, the smart device or smart watch may report the location of the first device. If the smart device moves out of a pre-defined area or location, the smart device may send a location update. Accordingly, there may be a location indication in school mode.

As indicated herein, aspects of the present disclosure can include a master control mode of a wireless wearable device, e.g., a smart watch or smart phone. In some aspects, the wireless wearable device can identify when a first user, e.g., a child, is in school or other specific location. Also, once the first user's wearable device enters a pre-defined area, e.g., a school, the wearable device may send a report to a pre-defined second user, e.g., a parent. This location may also be based on Wi-Fi, SSID, GPS, or a base station based positioning method.

Additionally, the second user can remotely trigger the remote control mode or school mode with a profile of parameters. For instance, the parameters can include a number of power related parameters, e.g., DRX and paging parameters, bandwidth parameters, or maximum transmission power parameters. Also, the parameters can include a whitelist which can allow certain types of calls during the remote control mode or school mode, e.g., calls to or from parents and/or emergency calls. Further, the parameters can include an allowed application list, e.g., session identifiers, certain allowed applications, or games. Moreover, the parameters can include positioning parameters or different positioning levels, e.g., a SSID, base station assisted information, or GPS information.

In some aspects, the remote control mode or school mode can be exited or closed in a variety of manners. For instance, the remote control mode or school mode can be exited automatically, i.e., without being turned off remotely. These exiting conditions can include when a first user leaves the pre-defined area or after a pre-defined time period, e.g., after school is out of session.

Some aspects of the present disclosure can rely of certain layers of wireless communication, e.g., an application layer, of the wireless device in order to remotely control the first device. For instance, a second user can also set a maximum amount of time for running certain applications on the first device, e.g., by using a remote control functionality. This remote control functionality can be communicated via certain layers of the wireless communication of the wireless device, e.g., an application layer.

In some aspects, different functionalities can be important to optimize power usage of the wireless device. For example, in remote control mode or school mode, a paging capability or a location report may be important to the optimize power consumption. Additionally, certain types of functionalities, e.g., transmitting a location report, may consume more power for certain modes. For instance, a location message can be sent via a message A (MSG-A) payload, e.g., a MSG-A PUSCH, of a two-step random access channel (RACH). Accordingly, the location message can be sent as a short message or a message with a small data amount. By doing so, the second device, e.g., a UE controlled by a second user or parent, may not need to send any further messages while optimizing power savings at the first device.

In addition, if the location message includes a large data amount, e.g., a GPS related message, in order to reduce the payload, the message may be based on a former message. For instance, if the difference between the current message and a former message is smaller than a threshold, the location report may be a single bit that indicates the same location as the former message. This can also satisfy a power consumption specification of the first device and/or the second device.

In some instances, the location message can also correspond to a message circle. The location message report periodicity can also be triggered by the movement detection of the smart device. So the periodicity of the location message can also be adjusted based on a movement or velocity of the user device. For example, the periodicity of the location message can increase or decrease based on whether the user device is moving.

Additionally, a paging capability can allow the first wireless device to optimize power savings. In some instances, a second user may utilize the paging capability to communicate with the first user of the first device during the power savings mode. For example, a second user, e.g., a parent, may utilize this paging capability to communicate with the first user, e.g., a child, during the remote control mode or school mode.

As indicated above, aspects of the present disclosure can include a remote control mode where a second user can remotely control a first user's device. A second user can also determine whether the first user fulfills a triggering threshold, which can trigger a power savings mode or remote control mode. The second user can also configure a set of parameters for the first device.

The triggering threshold may be based on a number of conditions. For instance, the triggering threshold may be a first user entering a predefined area, a certain time period, and/or may be indicated with a single act, e.g., pushing a button. For instance, the triggering threshold may be when a user arrives at a certain location, e.g., a school.

As indicated herein, the determination of a first user to enter a remote control or school mode may be based on a number of parameters. For example, the parameters can include a number of power related parameters, e.g., DRX and paging parameters, bandwidth parameters, or maximum transmission power parameters. The bandwidth parameters can be based on an aggregated bandwidth limit or a bandwidth parameter configuration. Additionally, the parameters can include a whitelist which can allow certain types of calls during the remote control mode or school mode, e.g., calls to or from parents and/or emergency calls. Further, the parameters can include an allowed application list, e.g., session identifiers, certain allowed applications, or games. The parameters can also include positioning parameters or different positioning levels, e.g., SSID, base station assisted information, or GPS information. When the positioning parameter includes base station assisted information, this base station assisted information can utilize one or more base stations, such that the positioning can be calculated based on a triangulation of the one or more base stations. These parameters can also be specific to the wireless device, e.g., a smart watch or UE, or specific to a type of application.

As indicated herein, during the configured period, the location message can be sent via a MSG-A payload, e.g., a MSG-A PUSCH. If the location message includes a large data amount, in order to reduce the payload, the message can be based on a former message or be a derivative of the former message. If the difference between the former message and the current message is smaller than a threshold, the location report can be a single bit to indicate same location as the former message. The location message can also be based on a message circle.

In addition, when one or more triggering events do not occur, the configured parameters can expire. This can be referred to as exiting or stopping the mode that triggers the configured parameters. For instance, when the configured parameters expire, the wireless wearable device can exit a remote control mode, power savings mode, or school mode.

Figure 4:
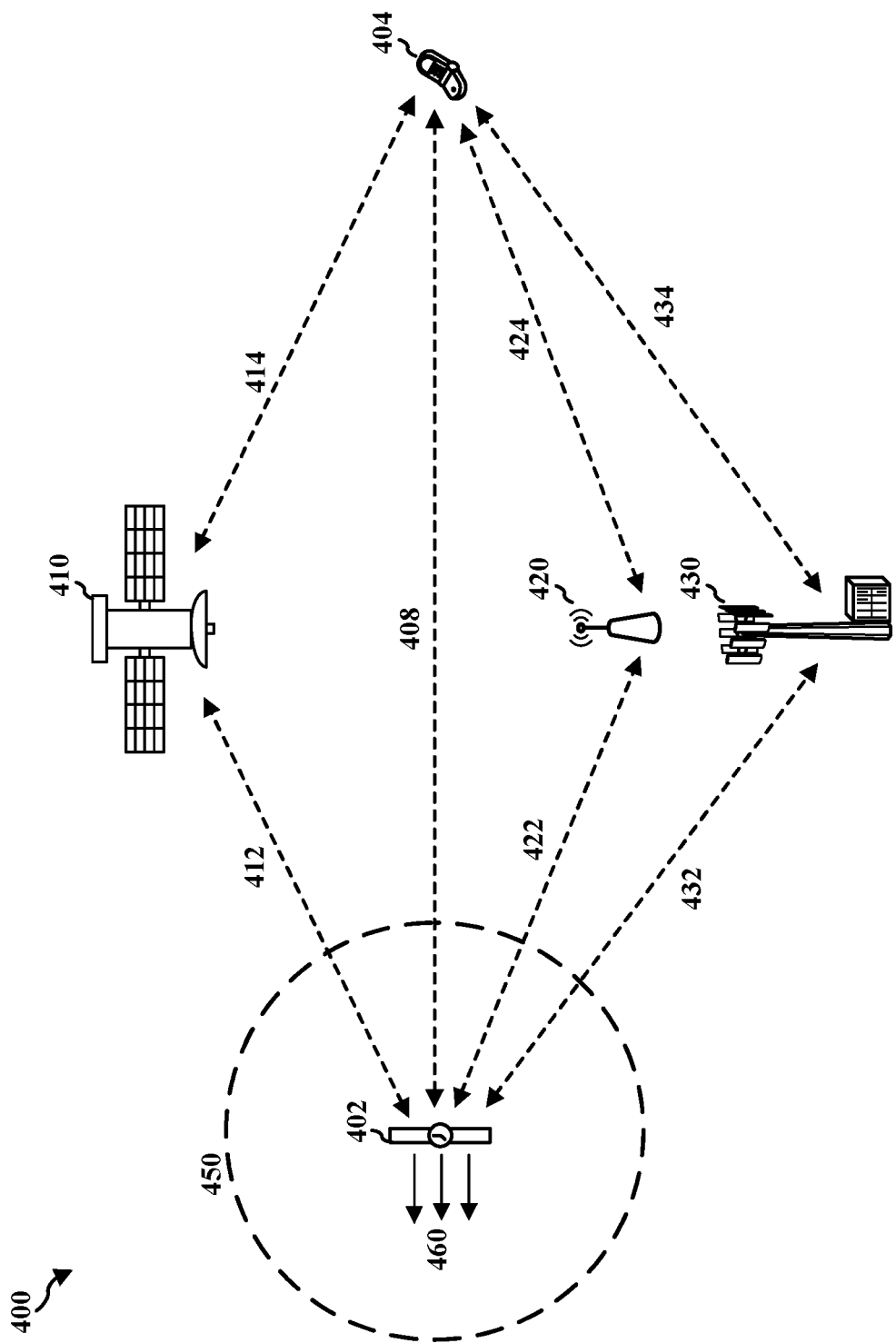
FIG. 4 is a diagram illustrating an example of wireless devices in a network.

FIG. 4 is a diagram 400 illustrating an example of wireless devices in a network. Diagram 400 includes wireless device 402, wireless device 404, satellite 410, access point 420, and base station 430. As shown in FIG. 4, diagram 400 also includes a variety of different communication, e.g., communication 408, 412, 414, 422, 424, 432, 434. Further, FIG. 4 shows that wireless device 402 can be in area 450, as well as moving at velocity 460. In some aspects, wireless device 402 may be a wearable device or a smart device, e.g., a smart watch, a smart phone, or a UE. Wireless device 404 may also be a wearable device or a smart device, e.g., a smart watch, a smart phone, or a UE.

As shown in FIG. 4, the wireless device 402 may determine to transmit a first report based on one of a location of the wireless wearable device, e.g., within area 450, a time period, or reception of a user-controlled indication to transmit the first report, e.g., an indication from wireless device 404. Also, the wireless device 402 may transmit the first report, e.g., via communication 408, 412, 414, 422, 424, 432, 434, based on one of the location of the wireless wearable device, e.g., within area 450, a time period, or reception of a user-controlled indication to transmit the first report.

The wireless device 402 may also receive, based on the transmitted first report, a configuration to switch from a first mode to a second mode, e.g., from device 404 via communication 408, 412, 414, 422, 424, 432, 434. In some aspects, the configuration can include at least one parameter associated with a power savings at the wireless wearable device while in the second mode. Additionally, the wireless device 402 may operate based on the at least one parameter while in the second mode.

In some aspects, the at least one parameter associated with a power savings at the wireless wearable device 402 may include at least one of a power-related parameter, a whitelist indicating allowed or disallowed calls, a whitelist indicating allowed or disallowed applications, or a positioning parameter. Also, the power-related parameter may include at least one of DRX and paging parameters, a bandwidth parameter, a maximum transmit power parameter, peak throughput parameter, or a reduced mobility parameter, e.g., a radio resource management (RRM) relaxation parameter. Moreover, the positioning parameter may include at least one of a SSID, e.g., Wi-Fi via access point 420, base station assisted information, e.g., via base station 430, or GPS information, e.g., via satellite 410.

Further, the wireless device 402 may determine to transmit a second report based on at least one of a location of the wireless wearable device 402, e.g., within area 450, or a velocity of the wireless wearable device 402, e.g., velocity 460. The wireless device 402 may also transmit the second report while in the second mode, e.g., via communication 408, 412, 414, 422, 424, 432, 434. In some aspects, the second report can be transmitted based on the at least one parameter.

In some aspects, the second report may be transmitted through a MSG-A PUSCH, e.g., communication 432/434 via base station 430. Also, the second report may comprise information indicating at least one of a change in a location of the wireless wearable device 402 greater than a first distance, that there has been no change in the location of the wireless wearable device 402 within a second distance, or a battery power of the wireless wearable device 402. Further, the second report can be transmitted with a periodicity that is based on at least one of a location of the wireless wearable device 402, e.g., within area 450 or outside of area 450, or a velocity of the wireless wearable device 402, e.g., velocity 460.

The wireless device 402 may also determine based on a trigger to switch from the second mode to the first mode. The wireless device 402 may also exit the second mode and enter into the first mode upon receiving the trigger to switch from the second mode to the first mode. In some aspects, the trigger may be determined based on leaving a pre-defined area, e.g., area 450, based on a pre-defined time, or based on an expiration of a timer. Also, the wireless device may be a modem within the wireless wearable device 402.

Figure 5:
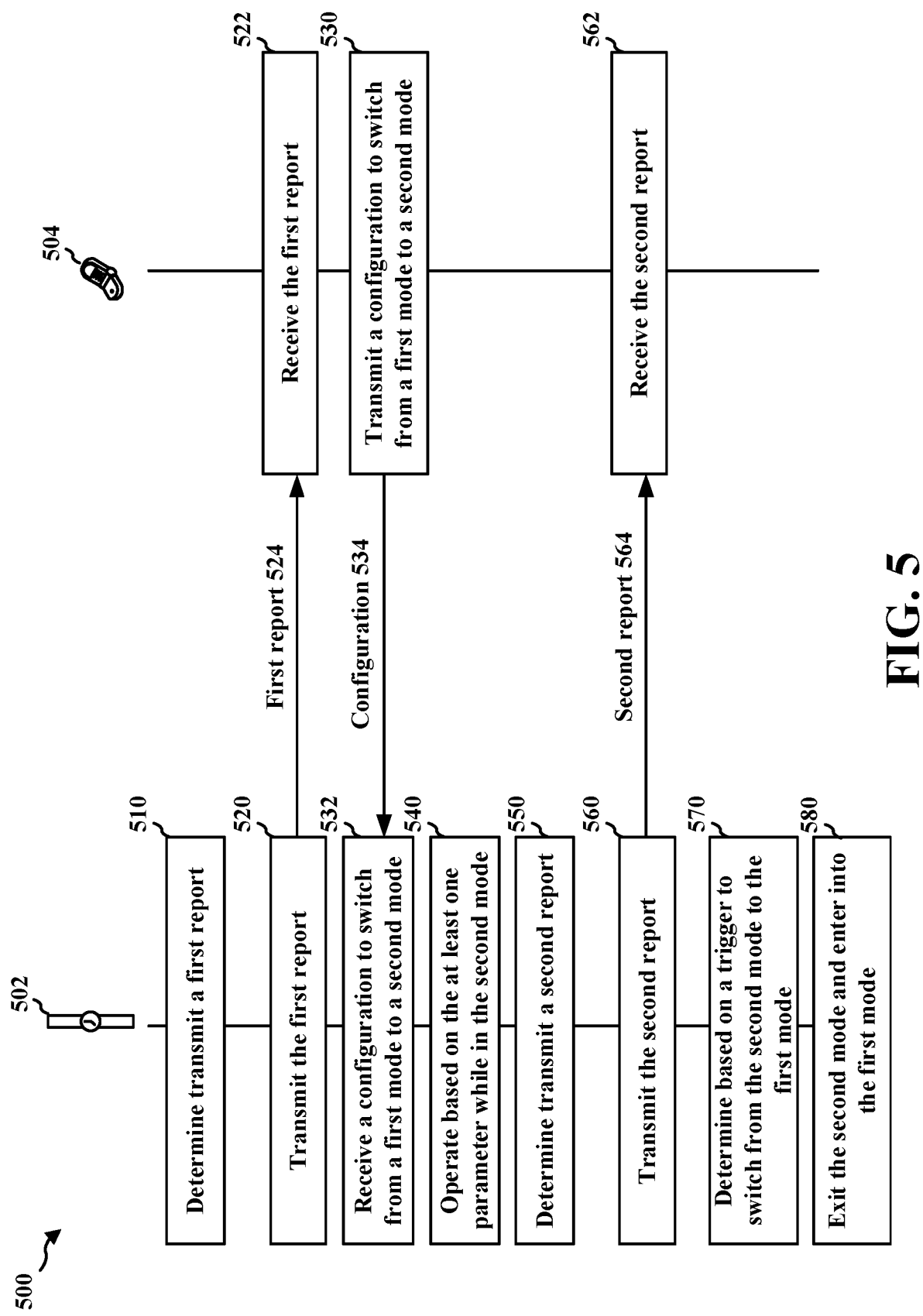
FIG. 5 is a diagram illustrating example communication between wireless devices.

FIG. 5 is a diagram 500 illustrating example communication between wireless devices. Diagram 500 includes wireless device 502 and wireless device 504. In some aspects, wireless device 502 may be a wearable device or a smart device, e.g., a smart watch, a smart phone, or a UE. Wireless device 504 may also be a wearable device or a smart device, e.g., a smart watch, a smart phone, or a UE.

As shown in FIG. 5, at 510, wireless device 502 may determine to transmit a first report based on one of a location of the wireless wearable device, a time period, or reception of a user-controlled indication to transmit the first report. At 520, the wireless device 502 may transmit the first report, e.g., first report 524, based on one of a location of the wireless wearable device, a time period, or reception of a user-controlled indication to transmit the first report. Likewise, at 522, the wireless device 504 may receive the first report, e.g., first report 524, based on one of a location of the wireless wearable device, a time period, or reception of a user-controlled indication to transmit the first report.

At 530, the wireless device 504 may transmit, based on the transmitted first report, a configuration, e.g., configuration 534, to switch from a first mode to a second mode. At 532, the wireless device 502 may receive, based on the transmitted first report, a configuration, e.g., configuration 534, to switch from a first mode to a second mode. In some aspects, the configuration, e.g., configuration 534, can include at least one parameter associated with a power savings at the wireless wearable device while in the second mode. At 540, the wireless device 502 may operate based on the at least one parameter while in the second mode.

In some aspects, the at least one parameter associated with a power savings at the wireless wearable device 502 may include at least one of a power-related parameter, a whitelist indicating allowed or disallowed calls, a whitelist indicating allowed or disallowed applications, or a positioning parameter. Also, the power-related parameter may include at least one of DRX and paging parameters, a bandwidth parameter, a maximum transmit power parameter, peak throughput parameter, or a reduced mobility parameter, e.g., a radio resource management (RRM) relaxation parameter. Moreover, the positioning parameter may include at least one of a SSID, base station assisted information, or GPS information.

At 550, the wireless device 502 may determine to transmit a second report based on at least one of a location of the wireless wearable device or a velocity of the wireless wearable device. At 560, the wireless device 502 may transmit the second report, e.g., second report 564, while in the second mode. In some aspects, the second report, e.g., second report 564, can be transmitted based on the at least one parameter. Likewise, at 562, the wireless device 504 may receive the second report, e.g., second report 564.

In some aspects, the second report, e.g., second report 564, may be transmitted through a MSG-A PUSCH. Also, the second report, e.g., second report 564, may comprise information indicating at least one of a change in a location of the wireless wearable device greater than a first distance, that there has been no change in the location of the wireless wearable device within a second distance, or a battery power of the wireless wearable device. Further, the second report, e.g., second report 564, can be transmitted with a periodicity that is based on at least one of a location of the wireless wearable device, or a velocity of the wireless wearable device.

At 570, the wireless device 502 may determine based on a trigger to switch from the second mode to the first mode. At 580, the wireless device 502 may also exit the second mode and enter into the first mode upon receiving the trigger to switch from the second mode to the first mode. In some aspects, the trigger may be determined based on leaving a pre-defined area, based on a pre-defined time, or based on an expiration of a timer. Also, the wireless device may be a modem within the wireless wearable device 502.

Figure 6:
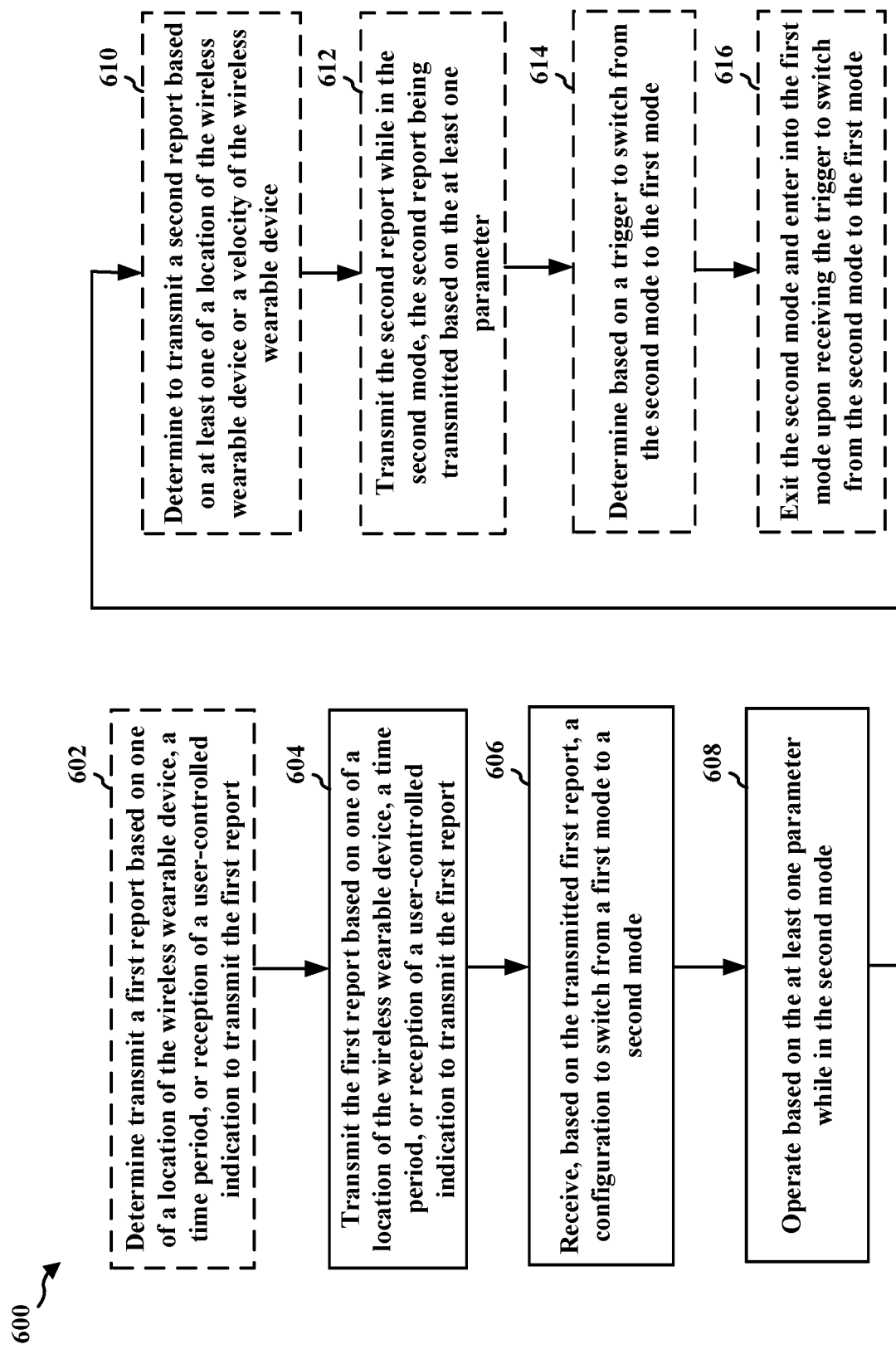
FIG. 6 is a flowchart of a method of wireless communication.

FIG. 6 is a flowchart 600 of a method of wireless communication. The method may be performed by a wireless device or a component of a wireless device, such as a smart watch or UE (e.g., UE 104, UE 350, device 402, device 404, device 502, device 504, which may include the memory 360 and which may be the entire UE 350 or a component of the UE 350, such as the TX processor 368, the RX processor 356, and/or the controller/processor 359). Optional aspects are illustrated with a dashed line. The methods described herein can provide a number of benefits, such as improving communication signaling, resource utilization, and/or power savings.

At 602, the wireless device may determine to transmit a first report based on one of a location of the wireless wearable device, a time period, or reception of a user-controlled indication to transmit the first report, as described in connection with the examples in FIGS. 4 and 5. At 604, the wireless device may transmit the first report based on one of a location of the wireless wearable device, a time period, or reception of a user-controlled indication to transmit the first report, as described in connection with the examples in FIGS. 4 and 5.

At 606, the wireless device may also receive, based on the transmitted first report, a configuration to switch from a first mode to a second mode, where the configuration can include at least one parameter associated with a power savings at the wireless wearable device while in the second mode, as described in connection with the examples in FIGS. 4 and 5. At 608, the wireless device may operate based on the at least one parameter while in the second mode, as described in connection with the examples in FIGS. 4 and 5.

In some aspects, the at least one parameter associated with a power savings at the wireless wearable device may include at least one of a power-related parameter, a whitelist indicating allowed or disallowed calls, a whitelist indicating allowed or disallowed applications, or a positioning parameter, as described in connection with the examples in FIGS. 4 and 5. Also, the power-related parameter may include at least one of DRX and paging parameters, a bandwidth parameter, a maximum transmit power parameter, peak throughput parameter, or a reduced mobility parameter, e.g., a radio resource management (RRM) relaxation parameter, as described in connection with the examples in FIGS. 4 and 5. Moreover, the positioning parameter may include at least one of a SSID, base station assisted information, or GPS information, as described in connection with the examples in FIGS. 4 and 5.

At 610, the wireless device may determine to transmit a second report based on at least one of a location of the wireless wearable device or a velocity of the wireless wearable device, as described in connection with the examples in FIGS. 4 and 5. At 612, the wireless device may also transmit the second report while in the second mode, where the second report can be transmitted based on the at least one parameter, as described in connection with the examples in FIGS. 4 and 5.

In some aspects, the second report may be transmitted through a MSG-A PUSCH, as described in connection with the examples in FIGS. 4 and 5. Also, the second report may comprise information indicating at least one of a change in a location of the wireless wearable device greater than a first distance, that there has been no change in the location of the wireless wearable device within a second distance, or a battery power of the wireless wearable device, as described in connection with the examples in FIGS. 4 and 5. Further, the second report can be transmitted with a periodicity that is based on at least one of a location of the wireless wearable device, or a velocity of the wireless wearable device, as described in connection with the examples in FIGS. 4 and 5.

At 614, the wireless device may determine based on a trigger to switch from the second mode to the first mode, as described in connection with the examples in FIGS. 4 and 5. At 616, the wireless device may also exit the second mode and enter into the first mode upon receiving the trigger to switch from the second mode to the first mode, as described in connection with the examples in FIGS. 4 and 5. In some aspects, the trigger may be determined based on leaving a pre-defined area, based on a pre-defined time, or based on an expiration of a timer, as described in connection with the examples in FIGS. 4 and 5. Also, the wireless device may be a modem within the wireless wearable device, as described in connection with the examples in FIGS. 4 and 5.

Further disclosure is included in the Appendix.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for".

Appendix

Master control mode of smart wearables

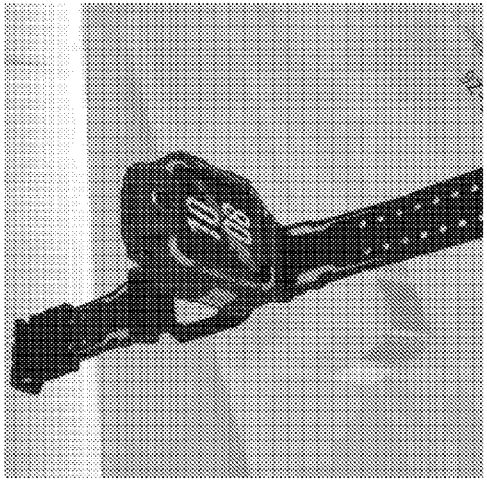

- Smart watches are popular for at least two use cases: a) location tracking of kids; b) 1-button call with parents. Some high end smartwatch can be capable of video calls
- During school, to keep the kids focused on studying, parents need a function that can remotely open & close some functions & APPs of the smart watch - e.g. phone/video call, SNS, and others, while positioning and to be paged by certain users.
- Two form factors - with and without video calls.

Issues

- Smart watch and other wearables are power limited terminals, how to save battery for "school mode" needs some lower layer optimization.

High level solutions - Remote control for school mode

- Define a "parents assisted signaling" to remotely trigger the kid's smart wearables' open or close "school mode". The parents assisted signaling includes
- Power related parameters - DRX & paging parameters, BW parameters, max Tx power
- Whitelist - allowed calls (from/to parents, and emergency)
- Allowed APPs (session ID) list
- Positioning parameter - different positioning level - SSID, BS assisted, GPS

Procedure

- Step 1 - identify the kid (1st user) is in school or other specific location
  - Once the kid's wearable comes to a pre-defined area (school), the wearable sends a report to the pre-defined 2nd user (parents)
  - The location could be based on WIFI SSID, GPS, gNB based positioning method.

- Step 2 - 2nd user remotely triggers the "school mode" with a profile of parameters
  - Power related parameters - DRX & paging parameters, BW parameters, max Tx power
  - Whitelist - allowed calls (from/to parents, and emergency)
  - Allowed APP (session ID) list
  - Positioning parameter - different positioning level - SSID, BS, GPS,

- Step 3 - how to exit the "school mode" except 2nd user (parents) turn it off.
  - Conditions include: kid leaves the pre-defined area, pre-defined time (class off).

School mode power optimization

- Two things can be important in school mode – paging and location report.

- The location report is the most power consuming message for the mode and could be further improved as
  - The location message is sent via the MSG-A payload (MSG-A PUSCH) of 2 step RACH. Then the UE doesn't need further message.
  - If the location message is very large, to reduce the payload, the message could be a delta of the former message.
  - If the delta is smaller than a threshold, the location report is only one bit to indicate same location as before.
  - The location message is with long message circle.
  - The location message report periodicity can be triggered by the movement detection of the smart wearables.

Claims

- a remote control mode that a 2nd user could remotely control the 1st Users, the procedure is
  - 2nd (master) user determines the 1st (controller) user fulfill some triggering threshold
  - 2nd (master) user configures a set of parameters for the 1st user.

- [kids arrive school] The triggering threshold could be one or combination of the 1st user is entering some predefined area, during certain time, and push certain button.

- [class mode] The parameter to be configured to the 1st user could be one or combination of the following
  - Power related parameters - DRX & paging parameters, BW parameters, max Tx power
  - Whitelist - allowed calls (from/to parents, and emergency)
  - Allowed APP (session ID) list
  - Positioning parameter - different positioning level - SSID, BS, GPS

- [exit class mode] In addition to the independent claim, when one or combination of the triggers does not exist, the configured parameters expires.

- During the configured period, The location message is sent via the MSG-A payload (MSG-A PUSCH).
  - If the location message is very large, to reduce the payload, the message could be a delta of the former message.
  - If the delta is smaller than a threshold, the location report is only one bit to indicate same location as before.
  - The location message is with long message circle.

What is claimed is:

1. A method of wireless communication at a wireless device of a wireless wearable device, comprising:
   transmitting a first report based on one of a location of the wireless wearable device, a time period, or reception of a user-controlled indication to transmit the first report;
   receiving, based on the transmitted first report, a configuration to switch from a first mode to a second mode, the configuration including at least one parameter associated with a power savings at the wireless wearable device while in the second mode; and
   operating based on the at least one parameter while in the second mode.

2. The method of claim 1, wherein the at least one parameter associated with a power savings at the wireless wearable device includes at least one of a power-related parameter, a whitelist indicating allowed or disallowed calls, a whitelist indicating allowed or disallowed applications, or a positioning parameter.

3. The method of claim 2, wherein the power-related parameter includes at least one of discontinuous reception (DRX) and paging parameters, a bandwidth parameter, a maximum transmit power parameter, peak throughput parameter, or a reduced mobility parameter.

4. The method of claim 2, wherein the positioning parameter includes at least one of a service set identifier (SSID), base station (BS) assisted information, or Global Positioning System (GPS) information.

5. The method of claim 1, wherein the operating based on the at least one parameter comprises:
   transmitting a second report while in the second mode, the second report being transmitted based on the at least one parameter.

6. The method of claim 5, wherein the second report is transmitted through a message A (MSG-A) physical uplink shared channel (PUSCH).

7. The method of claim 5, wherein the second report comprises information indicating at least one of a change in a location of the wireless wearable device greater than a first distance, that there has been no change in the location of the wireless wearable device within a second distance, or a battery power of the wireless wearable device.

8. The method of claim 5, wherein the second report is transmitted with a periodicity that is based on at least one of a location of the wireless wearable device, or a velocity of the wireless wearable device.

9. The method of claim 5, further comprising:
   determining to transmit the second report based on at least one of a location of the wireless wearable device or a velocity of the wireless wearable device.

10. The method of claim 1, further comprising:
    determining to transmit the first report based on one of the location of the wireless wearable device, the time period, or the reception of a user-controlled indication to transmit the first report.

11. The method of claim 1, further comprising:
    determining based on a trigger to switch from the second mode to the first mode; and
    exiting the second mode and entering into the first mode upon receiving the trigger to switch from the second mode to the first mode.

12. The method of claim 11, wherein the trigger is determined based on leaving a pre-defined area, based on a pre-defined time, or based on an expiration of a timer.

13. The method of claim 1, wherein the wireless device is a modem within the wireless wearable device.

14. An apparatus for wireless communication at a wireless device of a wireless wearable device, comprising:
    a memory; and
    at least one processor coupled to the memory and configured to:
    transmit a first report based on one of a location of the wireless wearable device, a time period, or reception of a user-controlled indication to transmit the first report;
    receive, based on the transmitted first report, a configuration to switch from a first mode to a second mode, the configuration including at least one parameter associated with a power savings at the wireless wearable device while in the second mode; and
    operate based on the at least one parameter while in the second mode.

15. The apparatus of claim 14, wherein the at least one parameter associated with a power savings at the wireless wearable device includes at least one of a power-related parameter, a whitelist indicating allowed or disallowed calls, a whitelist indicating allowed or disallowed applications, or a positioning parameter.

16. The apparatus of claim 15, wherein the power-related parameter includes at least one of discontinuous reception (DRX) and paging parameters, a bandwidth parameter, a maximum transmit power parameter, peak throughput parameter, or a reduced mobility parameter.

17. The apparatus of claim 15, wherein the positioning parameter includes at least one of a service set identifier (SSID), base station (BS) assisted information, or Global Positioning System (GPS) information.

18. The apparatus of claim 14, wherein to operate based on the at least one parameter comprises the at least one processor configured to:
    transmit a second report while in the second mode, the second report being transmitted based on the at least one parameter.

19. The apparatus of claim 18, wherein the second report is transmitted through a message A (MSG-A) physical uplink shared channel (PUSCH).

20. The apparatus of claim 18, wherein the second report comprises information indicating at least one of a change in a location of the wireless wearable device greater than a first distance, that there has been no change in the location of the wireless wearable device within a second distance, or a battery power of the wireless wearable device.

21. The apparatus of claim 18, wherein the second report is transmitted with a periodicity that is based on at least one of a location of the wireless wearable device, or a velocity of the wireless wearable device.

22. The apparatus of claim 18, further comprising the at least one processor configured to:
    determine to transmit the second report based on at least one of a location of the wireless wearable device or a velocity of the wireless wearable device.

23. The apparatus of claim 14, further comprising the at least one processor configured to:
    determine to transmit the first report based on one of the location of the wireless wearable device, the time period, or the reception of a user-controlled indication to transmit the first report.

24. The apparatus of claim 14, further comprising the at least one processor configured to:
    determine based on a trigger to switch from the second mode to the first mode; and
    exit the second mode and entering into the first mode upon receiving the trigger to switch from the second mode to the first mode.

25. The apparatus of claim 24, wherein the trigger is determined based on leaving a pre-defined area, based on a pre-defined time, or based on an expiration of a timer.

26. The apparatus of claim 14, wherein the wireless device is a modem within the wireless wearable device.

27. An apparatus for wireless communication at a wireless device of a wireless wearable device, comprising:
means for transmitting a first report based on one of a location of the wireless wearable device, a time period, or reception of a user-controlled indication to transmit the first report;
means for receiving, based on the transmitted first report, a configuration to switch from a first mode to a second mode, the configuration including at least one parameter associated with a power savings at the wireless wearable device while in the second mode; and
means for operating based on the at least one parameter while in the second mode.

28. The apparatus of claim 27, wherein the at least one parameter associated with a power savings at the wireless wearable device includes at least one of a power-related parameter, a whitelist indicating allowed or disallowed calls, a whitelist indicating allowed or disallowed applications, or a positioning parameter.

29. The apparatus of claim 28, wherein the power-related parameter includes at least one of discontinuous reception (DRX) and paging parameters, a bandwidth parameter, a maximum transmit power parameter, peak throughput parameter, or a reduced mobility parameter.

30. The apparatus of claim 28, wherein the positioning parameter includes at least one of a service set identifier (SSID), base station (BS) assisted information, or Global Positioning System (GPS) information.

31. The apparatus of claim 27, wherein the means for operating based on the at least one parameter is configured to:
transmit a second report while in the second mode, the second report being transmitted based on the at least one parameter.

32. The apparatus of claim 31, wherein the second report is transmitted through a message A (MSG-A) physical uplink shared channel (PUSCH).

33. The apparatus of claim 31, wherein the second report comprises information indicating at least one of a change in a location of the wireless wearable device greater than a first distance, that there has been no change in the location of the wireless wearable device within a second distance, or a battery power of the wireless wearable device.

34. The apparatus of claim 31, wherein the second report is transmitted with a periodicity that is based on at least one of a location of the wireless wearable device, or a velocity of the wireless wearable device.

35. The apparatus of claim 31, further comprising:
means for determining to transmit the second report based on at least one of a location of the wireless wearable device or a velocity of the wireless wearable device.

36. The apparatus of claim 27, further comprising:
means for determining to transmit the first report based on one of the location of the wireless wearable device, the time period, or the reception of a user-controlled indication to transmit the first report.

37. The apparatus of claim 27, further comprising:
means for determining based on a trigger to switch from the second mode to the first mode; and
means for exiting the second mode and entering into the first mode upon receiving the trigger to switch from the second mode to the first mode.

38. The apparatus of claim 37, wherein the trigger is determined based on leaving a pre-defined area, based on a pre-defined time, or based on an expiration of a timer.

39. The apparatus of claim 27, wherein the wireless device is a modem within the wireless wearable device.

40. A non-transitory computer-readable medium storing computer executable code for wireless communication at a wireless device of a wireless wearable device, the code when executed by a processor cause the processor to:
transmit a first report based on one of a location of the wireless wearable device, a time period, or reception of a user-controlled indication to transmit the first report;
receive, based on the transmitted first report, a configuration to switch from a first mode to a second mode, the configuration including at least one parameter associated with a power savings at the wireless wearable device while in the second mode; and
operate based on the at least one parameter while in the second mode.

* * * * *